March 19, 1968 A. H. SMITH 3,374,374
CONTROLLED-VELOCITY DRIVE
Original Filed May 6, 1964 3 Sheets-Sheet 1

Aubrey H. Smith,
Inventor.
Koenig, Senniger, Powers and Leavitt,
Attorneys.

March 19, 1968     A. H. SMITH     3,374,374
CONTROLLED-VELOCITY DRIVE
Original Filed May 6, 1964     3 Sheets-Sheet 2

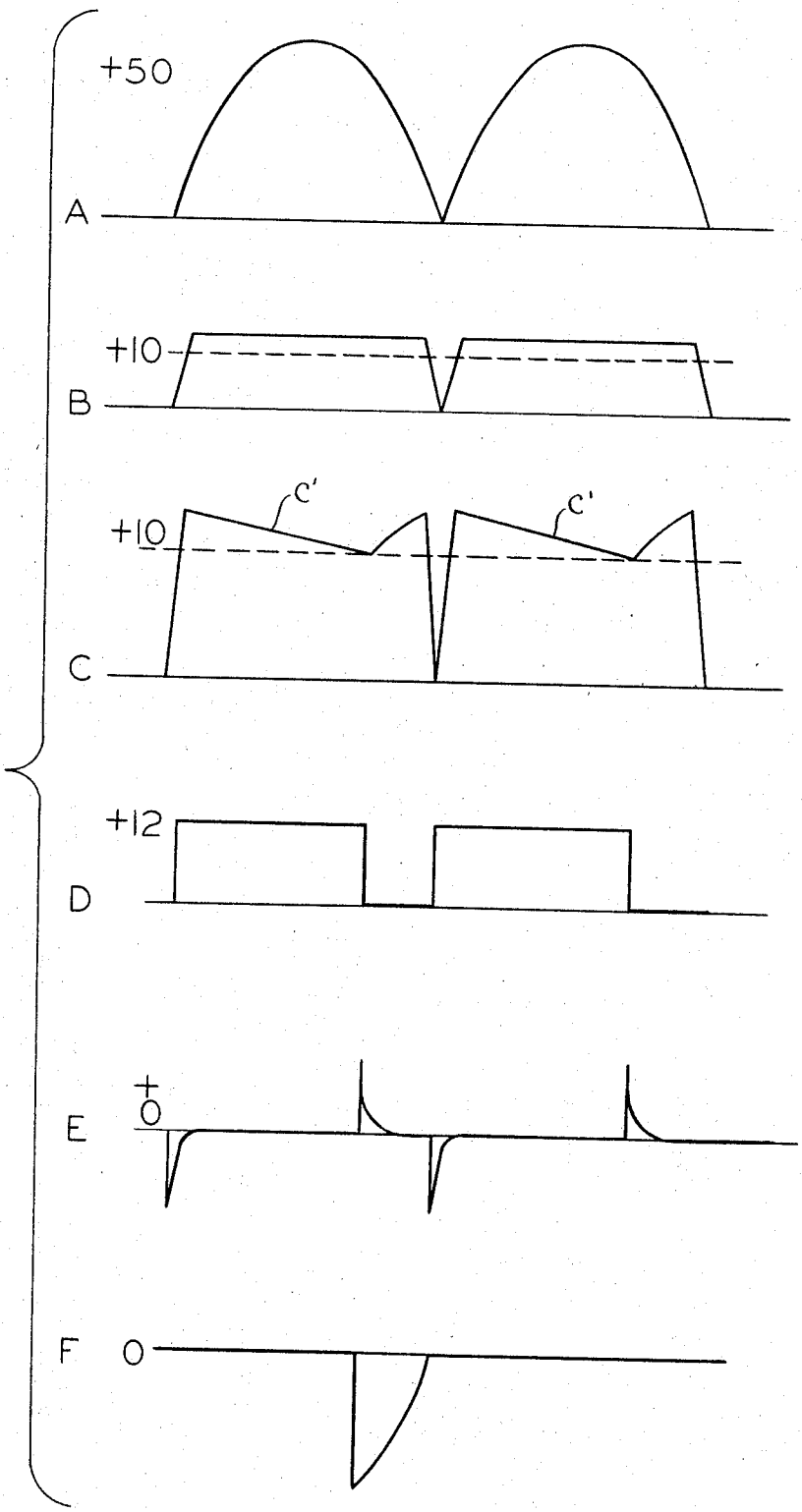

United States Patent Office 3,374,374
Patented Mar. 19, 1968

3,374,374
CONTROLLED-VELOCITY DRIVE
Aubrey H. Smith, Kenosha, Wis., assignor to Eaton Yale & Towne, Inc., Cleveland, Ohio, a corporation of Ohio
Continuation of application Ser. No. 365,413, May 6, 1964. This application Apr. 26, 1967, Ser. No. 642,622
13 Claims. (Cl. 310—94)

ABSTRACT OF THE DISCLOSURE

A solid-state speed control is disclosed in which the energization of the field winding of an eddy current coupling is varied in response to both a first error signal which is a function of the difference between the desired and actual speeds and a second error signal which is a function of the time integrated difference between the desired and actual speeds.

*Cross-reference to related application*

This application is a continuation of application Ser. No. 365,413, filed May 6, 1964, now abandoned.

*Background of the invention*

This invention relates to a controlled-velocity drive and more particularly to a solid-state switching control for an electromagnetic coupling device, for example an eddy-current clutch or the like.

This invention is an improvement over the apparatus shown in the copending application of myself and Lester T. Christensen, Ser. No. 310,093, filed Sept. 19, 1963, and entitled Controlled-Velocity Drive. The control system of the present invention provides an even closer speed regulation (viz., in the order of about 0.1%) as compared to the nonetheless close regulation of about 1% of the control of the aforesaid application.

While the control system according to the aforesaid application provides excellent speed regulation with an optimum time response to speed and load changes while avoiding system instability, higher degrees of precision are required for certain applications. This additional precision cannot be obtained merely by providing additional gain around the feedback control loop conventionally applied, because serious instabilities would result. Further, if the entire system were damped so as to overcome this instability, the optimum time response desirable to compensate for abrupt speed and load changes would be lost.

*Summary of the invention*

Accordingly, the particular objects of the invention include the provision of a solid-state control system for an electromagnetic coupling having exceptionally precise and improved speed regulation characteristics over an extensive speed range while being free of system instability, and the provision of such a system which provides optimally rapid response to abrupt load and speed changes. Further objects are the provision of a solid-state switching control for an electromagnetic coupling device having improved speed regulation characteristics over a greatly extended speed range; the provision of a speed-control system which is critically damped so that optimum response to speed and load changes is obtained while undesirable system oscillations are inherently resisted; the provision of a control of the class described which has relatively low thermal and inherent drift characteristics; and the provision of a speed-control system which is relatively inexpensive, easily and inexpensively maintained, and which exhibits a high degree of reliability in operation. Other objects and features will be in part apparent and in part pointed out hereinafter.

The present invention contemplates obtaining exceptional precision in regulation while retaining optimum response to speed and load changes and inherent stability, by providing two overall feedback paths one of which provides a corrective signal which is a function of the error in speed relative to a desired speed, and the other of which provides a corrective signal which is a function of the time integrated error in speed. Preferably, the feedback path providing the time integrated corrective signal has a much higher loop gain than the nonintegrating path so that the long-term regulation will be improved relative to the short-term regulation which is inherently limited by the requirements of system stability.

Control systems according to the invention are applicable in general to controlled-velocity drives having a driven member and a winding the energization of which controls the speed of said driven member. In common with the prior art, the control system includes means for sensing the angular velocity of the driven member and providing a feedback signal which is proportional to that angular velocity, means for providing a reference signal corresponding to the desired angular velocity of the driven member, and means for comparing these signals and providing a corrective signal which is proportional to the difference between the feedback and reference signals. This corrective signal is employed to modulate the current flowing through the winding so as to correct any deviation in speed of the driven member from the desired speed.

In the control system according to the invention, a means is provided for comparing said reference and feedback signals and providing a second corrective signal which is proportional to the time integrated difference between the actual angular velocity of said driven member and the desired angular velocity. These two corrective signals are mixed and their sum is employed to modulate a current passing through the winding so as to further correct any deviations in angular velocity.

In a particular aspect, the invention contemplates a control circuit to be employed in a controlled-velocity drive having a driven member, an electromagnetic coupling provided with a control winding, a source of electrical power, and a solid-state switching device, for example a silicon controlled rectifier, interconnected between the source and the control winding and adapted selectively to control the energization of this winding thereby to regulate the angular velocity of said driven member. The control system involves means for producing a reference voltage proportional to a preselected angular velocity of the driven member, a first feedback circuit including a tachometer for sensing the angular velocity of the driven member and producing a first feedback signal which varies as a function thereof, means for comparing said reference voltage and said feedback signal and producing a first corrective signal which is directly proportional to their algebraic sum, and means for comparing said reference voltage and said feedback signal and producing a second corrective signal which is proportional to the time integral of the algebraic sum of the compared signals. The control further involves means responsive to the algebraic sum of the two corrective signals for selectively actuating the solid-state switching device to maintain the angular velocity of the driven member substantially equal to the preselected angular velocity.

*Brief description of the drawings*

FIG. 3 illustrates various wave forms useful in explaining the operation of the FIG. 2 control.

Corresponding reference characters indicate corresponding parts throughout the several views of the drawings.

Description of the preferred embodiment

Figure 1:
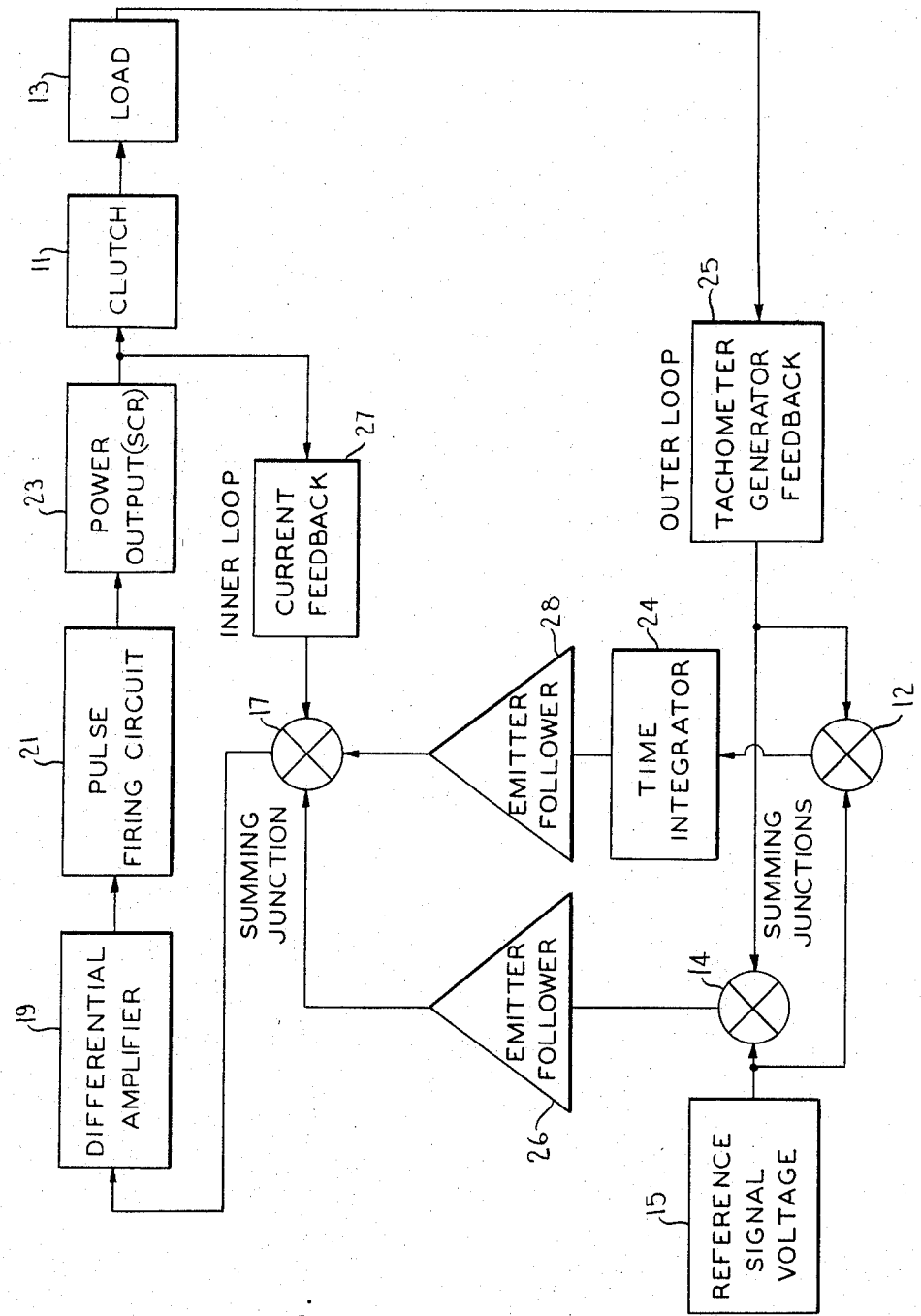
FIG. 1 is a block diagram illustrating functionally the major components of this embodiment and their interconnection.

Referring now to the drawings, and more particularly to FIG. 1, the present invention comprises a solid-state switching control for selectively energizing the field or control winding of an electromagnetic slip coupling device, for example an eddy-current clutch, or that of a D.C. motor. An eddycurrent clutch is indicated by the block 11 in FIG. 1. It functions to couple power from a rotating driving member (not shown) to a load or driven member indicated at 13. The purpose of the control is to energize this clutch so as to maintain the angular velocity of the driven member equal, or substantially equal (for example with 0.1% regulation), to a preselected or desired angular velocity.

A tachometer generator 25 provides a signal whose voltage is proportional to the angular velocity of the load 13, and a reference voltage source 15 provides a reference signal whose voltage corresponds to a preselected or desired angular velocity. The reference voltage and the feedback signal are each applied to both of a pair of summing junctions 12 and 14. As will be seen with reference to FIG. 2, the summing junctions may comprise merely resistively isolated solder joints within the control circuit. The composite output of the junction 14 (i.e., the algebraic sum of the signals applied thereto) is in turn applied, through an emitter-follower circuit 26, to another summing junction 17.

The composite output of the summing junction 12 is applied to a time integrator circuit 24 and the output of this circuit is also applied, through another emitter-follower circuit 28, to the summing junction 17 along with the nonintegrated composite signal coming from the junction 14. An inner feedback loop is provided by a current feedback control indicated at 27. This latter circuit responds to changes in the current through the clutch coil 11 and produces a third feedback signal to modify the power output accordingly. The third feedback signal is also applied to the summing junction 17. As explained hereinafter, this current feedback forms a high gain sensitivity feedback loop which lessens the response time of the control while insuring against undesirable system oscillations.

The composite output of the summing junction 17 is applied to the input of a differential amplifier 19 which serves to control the triggering of a pulse firing circuit 21. Circuit 21 controls the energization of a solid-state switching device 23, which may for example include a silicon controlled rectifier and which serves to control the energization of clutch 11 to maintain the speed of the driving member 13 equal to the preselected speed.

Figure 2:
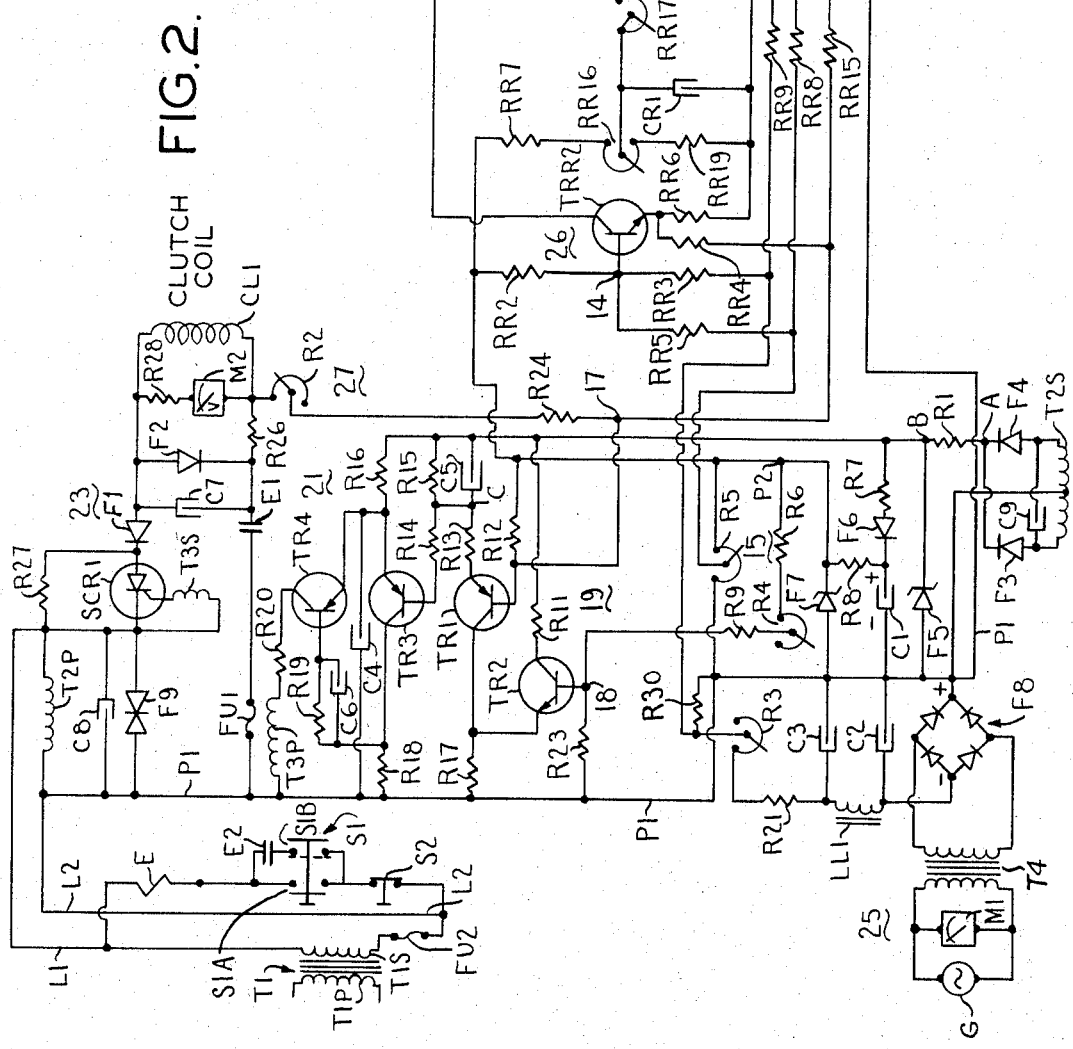
FIG. 2 is a schematic circuit diagram of the FIG. 1 system.

Referring now to FIG. 2 which illustrates the individual components which make up the FIG. 1 system and their interconnection, power for the control system is provided by a transformer T1 having a primary winding T1P and a secondary winding T1S. The former may be connected across a 220 v. or 440 v. A.C. source, for example, while the latter supplies A.C. power to the control circuit at 115 v. A.C. Connected across secondary winding T1S by a pair of conductors L1 and L2 and a fuse FU2 is the primary winding T2P of second transformer T2 which includes a center-tapped secondary winding T2S (shown at the bottom portion of the FIG. 2 schematic). A conventional "Jog-Run-Stop" control for the electromagnetic coupling device is provided by a jog-run switch S1 (having a first portion S1A and a second portion S1B), a stop switch S2, and a relay, the coil of which is indicated at E and the normally open contacts of which are shown at E1 and E2. To provide a momentary energization of the clutch winding (i.e., to provide a jog control) switch portion S1A is closed momentarily (contacts S1B remaining open) thereby energizing coil E and closing contacts E1 for a brief period. If the clutch is to remain energized (i.e., if a "run" operation is called for), both portions or contacts of switch S1 are closed. This not only energizes coil E, but also completes a holding circuit through contacts S1B and E1 to maintain coil E energized until stop switch S2 is opened.

The reference voltage and bias supply of the FIG. 1 control is illustrated in FIG. 2 as including transformer T2, the center-tapped secondary T2S of which is connected to supply power to a pair of rectifying diodes F3 and F4 which provide an unfiltered full-wave-rectified pulsating D.C. potential between a point or junction A and the center tap of secondary winding T2S. The latter is connected to a junction or bus P1 which forms the common bus of the circuit. A capacitor C9 is connected across winding T2S to provide a low impedance shunt to high frequency line transients. In addition to protecting diodes F3 and F4, this capacitor C9 serves to prevent misfiring of the pulse firing circuit described below. The wave form of the potential at point A with respect to point P1 is shown at A in FIG. 3.

A current limiting resistor R1 is connected in series with a Zener diode F5. The latter provides a clipping action thereby providing at point B a wave form as illustrated in FIG. 3B. The average D.C. potential of this FIG. 3B potential (again with respect to point P1) is +12 volts ±10%. The unfiltered potential appearing at point B is employed to provide power to the differential amplifier and the pulse firing circuit both described hereinafter. Because Zener diode F5 is not temperature compensated, the average D.C. potential at point B may vary with temperature.

A temperature compensated reference and bias supply portion of the circuit is interconnected with point B by a current limiting resistor R7 and an isolating or blocking diode F6. A filtering or smoothing capacitor C1 is connected between the cathode of diode F6 and point P1. The potential across this capacitor may be, for example, on the order of 11.5 v. D.C. Diode F6 prevents this potential from being applied to the differential amplifier or pulsing circuit. Connected across capacitor C1 is a regulating resistor R8 connected in series with a temperature compensated Zener diode F7. This series circuit provides a temperature compensated continuous D.C. potential between a point P2 and junction P1. This potential may have a value, for example, of from +8.55 v. to +9.45 v.

A rheostat or variable resistance R4 and a pair of fixed resistances R6 and R9 are connected in series between point P2 and a negative summing junction indicated at reference numeral 18. As will be apparent hereinafter, the setting of variable resistance R4 determines the minimum current through the clutch coil when the control is set for zero run speed.

A potentiometer R5 is connected across points P1 and P2 so as to bridge the temperature compensated D.C. potential described above, and the movable arm or slider of this potentiometer constitutes the source of the reference signal voltage 15 shown in FIG. 1. The movable arm is connected through resistors RR5 and RR8 to junctions 12 and 14. These junctions are, of course, the summing junctions referred to in describing FIG. 1. Potentiometer R5 may be set to any desired or preselected angular velocity of the driven member and provides at its movable arm a voltage which is proportional to or an analog of this preset velocity.

The tachometer feedback portion of the FIG. 2 control includes an A.C. generator or tachometer G mounted on the output shaft of the eddy-current coupling device. This generator has a voltage and frequency output which varies as a function of, or is proportional to, the output shaft velocity. A meter M1 is connected across the output of generator G to provide an indication of this output.

Generator G feeds an isolation transformer T4 and a full-wave bridge type rectifier indicated at F8. The output of rectifier F8 is filtered by a smoothing network or circuit consisting of a pair of capacitors C2 and C3 and a choke coil LL1. The latter is a swinging choke effective only at very low frequencies and currents. The rectified and filtered output of feedback generator G is divided in a resistive network including the serially connected fixed resistors R21 and R30 and rheostat R3.

Variable resistance R3 constitutes a control the setting of which determines the maximum speed of the driven member or load. The proper adjustment for resistance R3 is made with the run speed potentiometer R5 set at its maximum speed setting under rated load conditions. Rheostat R3 is adjusted so that the output of the coupling is rotated at the nameplate maximum rated output speed.

The voltage appearing at the movable arm of the resistance R3 is then the feedback signal representative of the angular velocity of the load 13, which feedback signal is then compared with the reference potential appearing at the arm of the potentiometer R5.

The feedback signal from the arm of the resistance R3 is applied through resistors RR3 and RR9 to the summing junctions 12 and 14.

It will be appreciated that, because the reference potential appearing at the movable arm of potentiometer R5 has a polarity which is opposite to the polarity of the tachometer feedback signal appearing at the arm of rheostat R3 (the former being positive with respect to point P1 and the latter being negative with respect thereto), the currents applied to summing junctions 12 and 14 have opposite signs.

The algebraic sum of the currents applied to the junction 14 is amplified without voltage gain by transistor TRR2 which is connected in a conventional emitter-follower configuration 26. The output voltage from the emitter of this transistor TRR2 is applied, through isolating resistor RR4, to summing junction 17.

Transistor TRR2 is biased, through resistor RR2, from the temperature-compensated voltage source available at junction P2 as described hereinbefore. It should be noted, however, that the output circuits of both emitter-follower amplifiers 26 and 28 and of the time integrator circuit 24 are supplied with current from a separate source (not shown) which provides both 15 volts positive and 15 volts negative potential, at the terminals 34 and 36 respectively, with reference to the common bus P1. The collector of transistor TRR2 is connected directly to the positive supply and the emitter of that transistor is connected through the load resistor RR6 to the negative supply.

The algebraic sum of the tachometer feedback and reference currents applied to the summing junction 12 is applied to the positive input terminal 2 of a high-gain differential amplifier 30. This amplifier is preferably a conventional modular or operational amplifier presently available from many sources. The positive and negative power supply terminals 34 and 36 are connected to the amplifier terminals 6 and 8 respectively, with the amplifier terminal 7 being tied to the common bus. The D.C. bias level for the negative input terminal 1 for the high-gain differential amplifier 30 is determined by a resistive divider network including the fixed resistors RR7 and RR19 and potentiometer RR16, which network connects the temperature-compensated voltage source available at P2 as described hereinbefore and the negative 15-volt source. This bias voltage is stabilized and filtered by capacitor CR1. The resistive source impedance applied to the negative input terminal of the amplifier is, however, limited and determined by adjustable rheostat RR17.

The output signal from terminal 4 of the differential amplifier is coupled back to the negative input terminal 1 through feedback capacitor CR2. In this way the differential amplifier 30 is caused to function, in conventional manner, as a time integrator of signals applied to its positive input terminal 2. The nominal time $t$, over which the integration is performed, is determined by the resistance value to which rheostat RR17 is set and the value of the capacitor CR2 as multiplied by the gain of the amplifier 30. Essentially the operation of the integrator circuit is that of a resistance-capacitance network in which an effective capacitance, larger than that easily provided in available units, is obtained by using a circuit including active elements as a capacitance multiplier. The time constant $t$ of the integrator system is chosen so as to be substantially larger than the response time of the nonintegrating feedback loop including the mechanical components such as the clutch.

The output signal from the terminal 4 of the amplifier 30 is also coupled, through isolating resistor RR10, to the base of transistor TRR3 which is connected in emitter-follower configuration so as to provide a low source impedance without voltage gain. Operational bias for the emitter-follower is obtained from the positive 15-volt source through resistor RR11 and the emitter is connected to the negative 15-volt source through a load resistor RR12.

The output signal from the emitter-follower stage 28 is applied, through SPST switch SW1 and by way of the resistive voltage divider including the fixed resistors RR13 and RR14, to summing junction 17 through isolating resistor RR15. This signal is of course a corrective signal which is generally proportional to the time-integrated difference between the angular velocity feedback signal and the reference signal.

At summing junction 17, the integrated corrective signal is mixed or summed with the nonintegrated corrective signal obtained from the emitter-follower stage 26 employing transistor TRR2. It should be understood that, for a given fixed deviation in angular velocity from that desired, the ultimate or long-term corrective signal from the integrator will be substantially stronger than the nonintegrated corrective signal due to the high gain of the amplifier 30.

The algebraic sum of the two corrective signals is also mixed at junction 17 with the output current feedback signal. This further algebraic sum of currents is applied to the base of a transistor TR1 which constitutes one of the transistors of the differential amplifier portion of the control. The other transistor of this amplifier is indicated at TR2.

A common emitter resistor R17 is interconnected between the emitters of transistors TR1 and TR2 and point P1, and a pair of matched load resistors R11 and R13 are connected to the respective collectors of these transistors. Resistor R11 is connected directly to point B while resistor R13 is connected to one terminal of a capacitor C5, the other terminal of which is connected to junction B. A current limiting resistor R12 connects the base of transistor TR1 with terminal P2. A similar resistor R23 connects the base of transistor TR2 with terminal or junction P1. The common connection between elements R13 and C5, point or junction C, constitutes the output terminal of the differential amplifier. The wave form of the potential appearing at the point C is illustrated in FIG. 3C. This potential, as explained hereinafter, controls the triggering or toggling of the pulse firing circuit, the latter in turn controlling the actuation of the solid-state switching device.

This pulse firing circuit consists of a modified Schmitt trigger circuit consisting of a pair of transistors TR3 and TR4, a common emitter resistor R16, and a pair of matched load resistors R18 and R20. A coupling network consisting of a resistor R19 and a shunt-connected capacitor C6 interconnects the collector of transistor TR3 with the base of transistor TR4. A filtering capacitor C4 is provided between common emitter resistor R16 and point P1 to maintain the threshold level of the Schmitt trigger circuit substantially constant regardless of transients in the system. The output of the differential amplifier appearing at point C is coupled through a current limiting resistor R14 to the base of transistor TR3. The common connection between resistor R14 and capacitor C5 is connected to point B by a resistor R15.

The output of the pulse firing circuit is coupled by an isolating pulse transformer to the gate electrode of a silicon controlled rectifier SCR1, the latter constituting the solid-state switching device mentioned above. The SCR1 and its associated components make up the power output portion of the control. The primary of the pulse transformer, indicated at T3P, is connected in the output circuit of the modified Schmitt trigger, between load resistor R20 and point P1. The secondary winding T3S of this transformer is connected between the gate or control electrode of SCR1 and its cathode.

The field or control winding of the electromagnetic clutch or coupling device under control is indicated at CL1. This coil is connected in series with a fuse FU1, contacts E1, a resistor R26, a diode F1, and the anode-cathode circuit of SCR1, and the resulting series loop is connected across lines L1 and L2. A back rectifier F2 connected across coil CL1 shorts out off-cycle transients in the coil, making the latter appear, for all practical purposes, to be a resistive load. Diode F1 and a resistor R27 are secondary protective devices which serve to protect the controlled rectifier SCR1 from high PIV's and also to prevent misfiring thereof from high transient voltages. Transient suppression capacitors C7 and C8 are connected respectively across clutch coil CL1 and secondary winding T2P to provide low impedance paths for high frequency transients appearing in the circuit. A surge resistor indicated at F9 is connected across winding T2P to protect the circuit from low frequency line transients.

A voltmeter M2 in series with a resistor R28 is connected across coil CL1 to provide a continuous indication of the degree of energization or excitation thereof.

The current feedback portion of the control which senses the current through coil CL1 is illustrated as comprising a resistor R26 and a series circuit consisting of a rheostat R2 and resistance R24. Resistor R26 is in series with the clutch coil, and hence the potential across this resistor is proportional to or a function of the current through the coil. This potential is fed to summing junction 17 by the variable resistance network consisting of rheostat R2 and resistor R24.

Operation of the FIG. 2 control is as follows:

With the switch SW1 in its "off" or open position, the low bias rheostat R4 is initially adjusted to establish a minimum current level through the clutch coil when the run speed potentiometer R5 is set at zero. It has been established that in a typical case rheostat R4 should be adjusted to provide for 5% excitation of the clutch coil when the run speed potentiometer is set at zero. This setting produces optimum thermal drift characteristics.

The run speed potentiometer R5 is then adjusted or set to the desired angular velocity of the driven member. A properly calibrated knob or dial, for example, could be provided to facilitate this adjustment. Switch S1 is then actuated to its "run" position. As explained above, this latter action completes a circuit which energizes relay coil E thereby causing normally open contacts E1 and E2 to close. The closing of contacts E2 establishes a holding circuit for coil E, while the actuation of contacts E1 connects the series circuit including the clutch coil CL1 and SCR1 across lines L1 and L2. Thereafter, the degree of energization of the clutch coil depends upon the selective actuation of SCR1, or more particularly, the period or length of time during which this SCR1 is rendered conductive during a cycle of the A.C. appearing across L1 and L2. It will be appreciated that because of the polarity of diode F1 and SCR1, coil CL1 can only be energized during the negative half-cycles of this A.C. potential.

Adjustment of potentiometer R5 causes a positive potential having a value proportional to the preset speed to be coupled through resistance RR5, emitter-follower TRR2 and resistor RR4 to the base of transistor TR1. Since the emitter-collector circuit of this transistor is series-connected with capacitor C5, the conductivity of this transistor controls the charging rate of this capacitor. Stated somewhat differently, capacitor C5, resistor R13, the emitter-collector circuit of TR1, and resistance R17 constitute an RC circuit, the R of which is controlled by the base-emitter potential of transistor TR1. Thus, increasing the positive potential at summing junction 17 causes capacitor C5 to charge at a more rapid rate.

Since the potential across a capacitor cannot change instantaneously, the potential at point C builds up concurrently with the leading edge of a pulse at point B. Initially, i.e., in the quiescent state, transistor TR4 of the modified Schmitt trigger circuit is conducting and transistor TR3 cut off. As the potential at point C builds up to exceed the threshold level of the Schmitt trigger (assumed for purposes of explanation to be 10 volts), transistor TR3 is triggered into conduction. Periods of conduction of TR3 are shown in FIG. 3D. Concurrently, transistor TR4 is cut off or rendered nonconducting. This causes a negative-going pulse (shown in FIG. 3E) to be coupled through secondary winding T3S to the gate of SCR1, thereby insuring that the SCR is in its off or nonconducting state during periods of conduction of transistor TR3.

The charging of capacitor C5 causes the potential at point C to decrease at a rate proportional to the charging rate of the capacitor. This decreasing potential is indicated at C' in FIG. 3C, the downward slope of this portion being a function of the conductivity of transistor TR1. Transistor TR3 remains conducting until the portion C' reaches the 10-volt trigger level of the Schmitt circuit, at which time transistor TR3 is cut off. This causes conduction of transistor TR4 which in turn causes a positive pulse spike to be coupled to the gate or control electrode of SCR1. Assuming proper polarity of the A.C. potential across L1 and L2, this spike causes conduction of SCR1 and concurrent energization of coil CL1. The pulse applied to this coil is shown in FIG. 3F, it being assumed that during the first half-cycle of the FIG. 3 wave forms line L1 is negative with respect to line L2.

It will be apparent that the duration of the pulse shown in FIG. 3F (and hence the degree of energization of the coil CL1) is dependent solely on the charging rate of capacitor C5. This charging rate is in turn dependent upon the potential at junction 17.

During the subsequent half-cycle of the FIG. 3 wave forms the same control functions take place, i.e., the pulse firing circuit again triggers the gate of SCR1; however, a pulse is not applied to the clutch coil since line L1 is positive with respect to line L2. It will be understood that if a pair of SCR's are interconnected with coil CL1 to form a full-wave configuration (as opposed to the half-wave arrangement illustrated in FIG. 2), a pulse having a controlled duration would be applied to coil CL1 during each half-cycle of the A.C. applied to lines L1 and L2.

Energization of coil CL1 couples the driving member (for example a motor) with the rotatable driven member or load 13. The angular velocity of the driven member depends for the most part on the degree of energization of coil CL1. To sense this angular velocity and feed back a control signal proportional thereto, tachometer generator G is, as mentioned above, mounted on the output shaft of the coupling device. Immediately after initial energization of coil CL1, the output of the generator feedback (coupled through resistor RR3, emitter-follower TRR2 and resistor RR4 to point 17) is at a very low value. Consequently, the positive potential at summing junction 17 is at a relatively high value. This increases the conductivity of transistor TR1, causes capacitor C5 to be charged at a rapid rate, and thereby increases the power supplied to the clutch coil through SCR1. This increases the coupling between the driving and driven members, increasing the speed of the latter. The resulting increase in speed is sensed by generator G which provides a correcting negative voltage to point 17, reducing the base-emitter bias on transistor TR1 and thereby reducing the charging rate of capacitor C5. This in turn reduces the time during which SCR1 is conductive and thus reduces the degree of energization of coil CL1. When the speed of the driven member reaches the preset level, the current supplied to coil CL1 is sufficient merely to maintain this desired speed. Excursions in the actual speed of the load above or below the desired speed are sensed by the tachometer feedback, and the power to coil CL1 is either increased or decreased, whichever action is necessary to bring the actual speed back to the desired level.

To decrease the response time of the system, the inner feedback loop 27 senses the current through the clutch coil CL1 and applies a negative feedback signal to point 17 proportional to this current. This inner loop consists of resistor R26 and series resistors R2 and R24. Once the desired speed has been attained, incipient variations in the current through coil CL1 are reflected back to the summing junction 17 in the form of a degenerative feedback. This degenerative feedback requires a somewhat higher overall gain for the system; however, depending on the setting of rheostat R2, the response time can be considerably reduced, for example, by a factor of 10. And since this response time can be reduced synthetically, a system which would be unstable can be made to be stable. For example, if the closed loop is unstable with a total response time T equal to .3 second, reducing this response time synthetically to a value of .03 second assures that the system will be stable. This not only insures against system oscillations, but also permits the design of a system which is critically damped.

With just the nonintegrated feedback applied, as described above, speed regulation within approximately ±1% can be obtained over a speed range of 33:1.

By throwing switch SW1 to the "on" position, further corrective feedback is applied through the summing junctions 16 and 17 and the ultimate or long-term speed regulation can be brought to within approximately ±0.1% over the same speed range. As discussed previously, the large additional amount of feedback cannot be applied directly in that it would cause substantial system instability. According to this invention this large amount of additional feedback is obtained from a time-integrated error signal, the time of integration being substantially longer than the inherent response time of the feedback loop, so that instability is avoided.

It should be understood, however, that, by mixing the integrated corrective signal with the direct corrective signal obtained at the summing junction 14, the optimum response time for a given set of system parameters is obtained and no sacrifice in response time is made as compared with the system disclosed in the previously identified copending application.

In view of the above, it will be seen that the several objects of the invention are achieved and other advantageous results attained.

As various changes could be made in the above constructions and circuits without departing from the scope of the invention, it is intended that all matter contained in the above descripion or shown in the accompanying drawings shall be interpreted as illustrative and not in a limiting sense.

What is claimed is:

1. In a controlled-velocity drive having a driven member and a winding the energization of which controls the speed of said driven member; a control system for said winding comprising: means for sensing the angular velocity of said driven member and providing a feedback signal which is a function of that angular velocity; means providing a reference signal corresponding to the desired angular velocity of said driven member; means for comparing said reference and feedback signals and providing a first corrective signal which is a function of the difference between the actual angular velocity of said driven member and the desired angular velocity; means for comparing said reference and feedback signals and providing a second corrective signal which is a function of the time integrated difference between the actual velocity of said driven member and the desired angular velocity; means for mixing said first and second corrective signals; and means responsive to the sum of said corrective signals for modulating a current flowing through said winding in a sense tending to correct any deviation of the actual angular velocity of said driven member from the desired angular velocity.

2. A control system according to claim 1 in which the means for providing said second corrective signal has a higher gain than the means providing said first corrective signal.

3. A control system according to claim 1 in which said means for providing said second corrective signal includes a resistance-capacitance time integrating network.

4. A control system according to claim 3 in which the time constant of said network is substantially larger than the response time of the first corrective signal.

5. A control system according to claim 3 in which the effective integrating capacitance is obtained by providing capacitive negative feedback around a high gain amplifier whereby the value of actual capacitance necessary to obtain long-term integration is substantially reduced.

6. A control system according to claim 1 including means for providing a negative feedback signal proportional to the current flowing through said coupling and mixing said negative feedback signal with said first and second corrective signals.

7. A control system according to claim 1 in which said current modulating means includes a silicon controlled rectifier and means for adjusting the firing time thereof to control the coupling current in response to the sum of the corrective signals.

8. In a controlled-velocity drive having a driven member, an electromagnetic coupling provided with a control winding, a source of electrical power, and a solid-state switching device interconnected between said source and said winding and adapted selectively to control the energization of said winding thereby to regulate the angular velocity of said driven member; a control for said switching device comprising: means for producing a reference voltage proportional to a preselected angular velocity of said driven member; a first feedback circuit sensing the angular velocity of said driven member and producing a first feedback signal which varies as a function thereof; a second feedback circuit, including a resistive-capacitive integrating network, sensing the angular velocity of said driven member and producing a second feedback signal which varies as a time integrated function thereof; a third feedback circuit rsponsive to the current through said winding and providing a third feedback signal which varies as a function thereof; and means responsive to said reference voltage and to said first, second and third feedback signals for selectively actuating said switching device to maintain the angular velocity of said driven member substantially equal to said preselected angular velocity.

9. In a controlled-velocity drive as set forth in claim 8, said third feedback circuit comprising a resistor connected in series with said winding whereby the voltage across said resistor is proportional to the current through said winding.

10. In a controlled-velocity system as set forth in claim 9, said third feedback circuit further comprising a variable resistance interconnected with said resistor, the setting of said variable resistance determining the amplitude of said third feedback signal.

11. A control system according to claim 8 in which said second feedback circuit has a higher gain than said first feedback circuit.

12. A control system according to claim 8 in which the time constant of said network is substantially larger than the response time of said first feedback circuit.

13. A control system according to claim 8 in which the integrating capacitance in said network is obtained by providing capacitive negative feedback around a high gain amplifier whereby the value of capacitance necessary to obtain long-term integration is substantially reduced.

No references cited.

ROBERT K. SCHAEFER, *Primary Examiner.*

H. O. JONES, *Assistant Examiner.*